United States Patent
Nishio (10) Patent No.: US 10,216,462 B2
(45) Date of Patent: Feb. 26, 2019

(54) DISPLAY DEVICE AND IMAGE FORMING APPARATUS INCLUDING A MODE SHIFT CONTROL UNIT, STORAGE CONTROL UNIT, AND A DISPLAY CONTROL UNIT

(71) Applicant: KYOCERA Document Solutions Inc., Osaka-shi, Osaka (JP)

(72) Inventor: Ken Nishio, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days.

(21) Appl. No.: 15/901,912

(22) Filed: Feb. 22, 2018

(65) Prior Publication Data
US 2018/0246687 A1    Aug. 30, 2018

(30) Foreign Application Priority Data

Feb. 24, 2017 (JP) .................. 2017-33030

(51) Int. Cl.
G06F 3/12   (2006.01)
H04N 1/00   (2006.01)

(52) U.S. Cl.
CPC .......... *G06F 3/1221* (2013.01); *G06F 1/3284* (2013.01); *G06F 3/1229* (2013.01); *H04N 1/00885* (2013.01)

(58) Field of Classification Search
USPC ............ 345/52, 99; 379/221, 264, 301–303; 358/1.1–3.29, 1.11–1.18, 413, 437; 399/8–12, 33, 37, 67–70, 88–90
See application file for complete search history.

(56) References Cited

U.S. PATENT DOCUMENTS

| | | | | |
|---|---|---|---|---|
| 2013/0229689 A1* | 9/2013 | Bito | .................. | H04N 1/32026 358/1.15 |
| 2014/0078535 A1* | 3/2014 | Okada | ................ | H04N 1/00411 358/1.13 |
| 2014/0118771 A1* | 5/2014 | Tamura | .............. | H04N 1/00204 358/1.13 |
| 2015/0281479 A1* | 10/2015 | Maruyama | ............ | G06F 3/0481 358/1.15 |
| 2017/0104881 A1* | 4/2017 | Hashimoto | ........ | H04N 1/00503 |

FOREIGN PATENT DOCUMENTS

| | | |
|---|---|---|
| JP | H0863051 A | 3/1996 |
| JP | 2007256543 A | 10/2007 |

* cited by examiner

*Primary Examiner* — Marcellus Augustin
(74) *Attorney, Agent, or Firm* — Viering, Jentschura & Partner mbB (57) ABSTRACT

The display device includes a mode shift control unit, a storage control unit, and a display control unit. The mode shift control unit performs such control that if a first condition is satisfied in a first mode, a display screen is not displayed and the first mode shifts to a second mode, and that if a second condition is satisfied in the second mode, the display screen is displayed and the second mode shifts to the first mode. The display control unit performs such control that when the second mode shifts to the first mode by the mode shift control unit, as information displayed on the display screen, an entry of the first setting stored in the storage section is displayed for the first setting and an entry of an initial setting is displayed for the second setting.

10 Claims, 6 Drawing Sheets

DISPLAY DEVICE AND IMAGE FORMING APPARATUS INCLUDING A MODE SHIFT CONTROL UNIT, STORAGE CONTROL UNIT, AND A DISPLAY CONTROL UNIT

CROSS-REFERENCE TO RELATED APPLICATION

This application claims priority to Japanese Patent Application No. 2017-33030, which was filed Feb. 24, 2017, and is incorporated herein by reference in its entirety.

BACKGROUND

The present disclosure relates to a display device and an image forming apparatus.

In an image forming apparatus typified by a multifunction peripheral, an image on a document is read by an image reading unit and a photoreceptor included in an image forming unit is irradiated with light based on the read image so that an electrostatic latent image is formed on the photoreceptor. Thereafter, charged toner is supplied onto the electrostatic latent image to form a toner image, and the toner image is transferred onto a paper sheet and fixed by a fixing device. The resulting paper sheet is then ejected out of the device.

Some recent image forming apparatuses have a power saving mode in which power supply to a fixing device is reduced or a touch panel of an operation section is turned off in a standby state, that is, in a state where image formation is not requested, from the viewpoint of saving power consumption in the standby state. The power saving mode is a so-called sleep mode in which an image cannot be instantly formed in response to an image formation request but power consumption can be efficiently reduced in the standby mode. In forming an image, an image forming apparatus shifts to a standby mode in which an image can be immediately formed from the power saving mode, and an image is formed. This shift is performed by receiving an externally input return signal, specifically, a signal of detection of contact with the touch panel of the operation section or a signal of a print request from a computer connected to the image forming apparatus through a network.

There is a known technique related to an image forming apparatus that shifts to a power saving mode in a standby state.

An image forming apparatus that has been known to date has a power saving mode in which power consumption is reduced by reducing or cutting off power supply to devices after an image forming operation is finished or after a lapse of a predetermined time from a termination of a key operation. This image forming apparatus has a feature of including a storage means for storing image forming condition information that has been set immediately before entering the power saving mode and a setting control means for setting a device based on the image forming condition information read out from the storage means in cancelling the power saving mode.

Another image forming apparatus that has been known to date includes a power control means for switching a power control state of a device from a normal mode to a power saving mode of saving power consumption after a lapse of a first set time, an auto clear means for returning a display menu of an operation section whose operation is set to an initial menu after a lapse of a second set time, and a time change setting means capable of setting a change of the first set time or the second set time from an initial set value. In this image forming apparatus, when a time relationship is set in such a manner that at least the first set time is shorter than the second set time, data corresponding to the display menu is held until a lapse of the second set time even after a lapse of the first set time.

SUMMARY

In an aspect of the present disclosure, a display device has a first mode in which a predetermined power is consumed and a second mode in which a power smaller than the predetermined power is consumed. The display device includes an input receiving unit, a classification unit, a display screen, a storage section, a mode shift control unit, a storage control unit, and a display control unit. The input receiving unit receives an input of information. The classification unit classifies the information received by the input receiving unit into a first setting and a second setting. The display screen is capable of displaying the information received by the input receiving unit. The storage section stores data. The mode shift control unit performs such control that if a first condition is satisfied in the first mode, the display screen is not displayed and the first mode shifts to the second mode, and that if a second condition is satisfied in the second mode, the display screen is displayed and the second mode shifts to the first mode. The storage control unit performs such control that the storage section stores data of the first setting and the second setting when the first mode shifts to the second mode by the mode shift control unit. The display control unit performs such control that as information displayed on the display screen, an entry of the first setting stored in the storage section is displayed for the first setting and an entry of an initial setting is displayed for the second setting when the second mode shifts to the first mode by the mode shift control unit.

In another aspect of the present disclosure, an image forming apparatus includes: a display device for displaying information having a first mode in which a predetermined power is consumed and a second mode in which a power smaller than the predetermined power is consumed; and an image forming unit that forms an image in accordance with an image forming condition for which an input is received by the display device in the first mode. The display device includes an input receiving unit, a classification unit, a display screen, a storage section, a mode shift control unit, a storage control unit, and a display control unit. The input receiving unit receives an input of information. The classification unit classifies the information received by the input receiving unit into a first setting and a second setting. The display screen is capable of displaying the information received by the input receiving unit. The storage section stores data. The mode shift control unit performs such control that if a first condition is satisfied in the first mode, the display screen is not displayed and the first mode shifts to the second mode, and that if a second condition is satisfied in the second mode, the display screen is displayed and the second mode shifts to the first mode. The storage control unit performs such control that the storage section stores data of the first setting and the second setting when the first mode shifts to the second mode by the mode shift control unit. The display control unit performs such control that as information displayed on the display screen, an entry of the first setting stored in the storage section is displayed for the first setting and an entry of an initial setting is displayed for the second setting when the second mode shifts to the first mode by the mode shift control unit.

DETAILED DESCRIPTION

Figure 1:
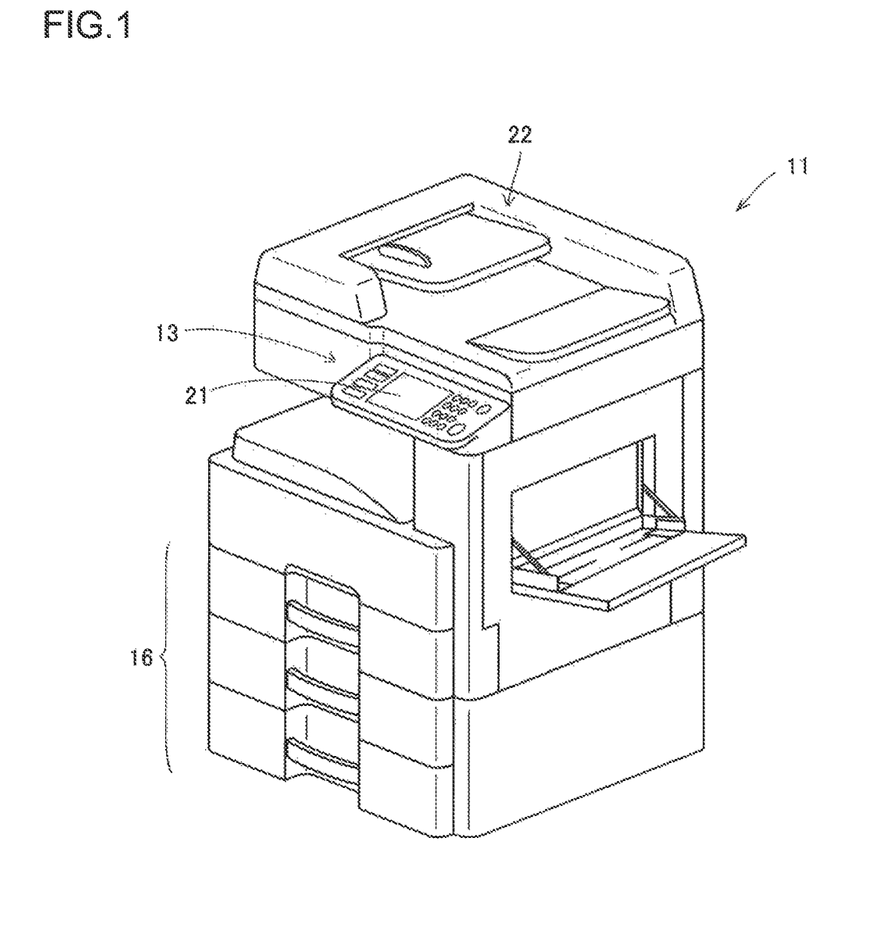
FIG. 1 illustrates a multifunction peripheral in a case where an image forming apparatus including a display device according to an embodiment of the present disclosure is applied to the multifunction peripheral.
Figure 2:
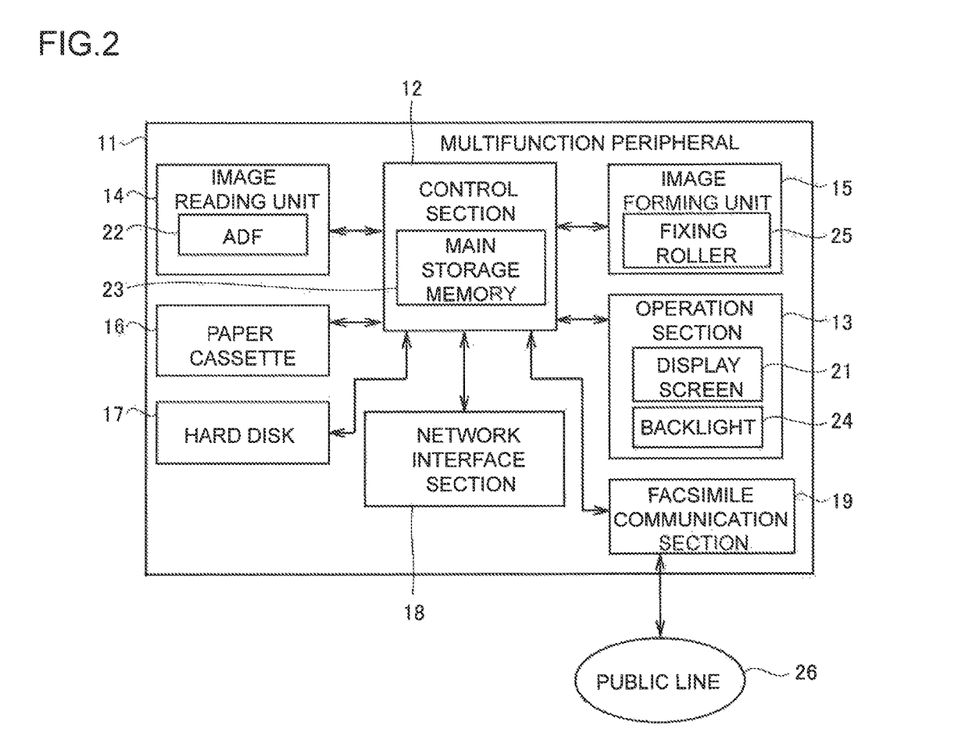
FIG. 2 is a block diagram illustrating a configuration of the multifunction peripheral illustrated in FIG. 1.

An embodiment of the present disclosure will be described hereinafter. FIG. 1 is a schematic view illustrating an appearance of a multifunction peripheral in a case where an image forming apparatus including a display device according to an embodiment of the present disclosure is applied to the multifunction peripheral. FIG. 2 is a block diagram illustrating a configuration of the multifunction peripheral illustrated in FIG. 1.

With reference to FIGS. 1 and 2, a multifunction peripheral 11 relates to an image processing and has a plurality of functions such as a copying function, a printer function, and a facsimile function. The multifunction peripheral 11 includes a control section 12, an operation section 13 as a display device, an image reading unit 14, an image forming unit 15, a plurality of paper cassettes 16, a hard disk 17, a network interface section 18 for connection to a network, and a facsimile communication section 19.

The control section 12 controls the entire multifunction peripheral 11. The control section 12 is constituted by, for example, a central processing unit (CPU), and includes a main storage memory 23 that temporarily stores data. The operation section 13 includes a display screen 21 that is a touch panel liquid crystal display (LCD) for displaying information issued from the multifunction peripheral 11 and entries made by a user. The operation section 13 also includes, for example, numeric keys 31 for receiving inputs of numbers and others by pressing, and receives an input from the user regarding image formation exemplified by image forming conditions such as the number of copies and a gradation degree. The image reading unit 14 includes an auto document feeder (ADF) 22 as a document feeder for conveying a document loaded on a set position to a reading position. The image reading unit 14 reads an image on a document loaded on the ADF 22 or a placing table. Each of the plurality of paper cassettes 16 houses a plurality of paper sheets therein. The image forming unit 15 includes a fixing roller 25 for fixing a toner image on a paper sheet. In fixing the toner image on the paper sheet, the fixing roller 25 is heated to a predetermined temperature. The image forming unit 15 forms an image on a paper sheet conveyed from one of the paper cassettes 16, based on image data on a document read by the image reading unit 14 or image data transmitted through the network. The hard disk 17 as a storage section is so-called nonvolatile, and stores data regarding image formation, such as transmitted image data or input image forming conditions. The facsimile communication section 19 is connected to a public line 26 and performs facsimile transmission and facsimile reception.

Figure 3:
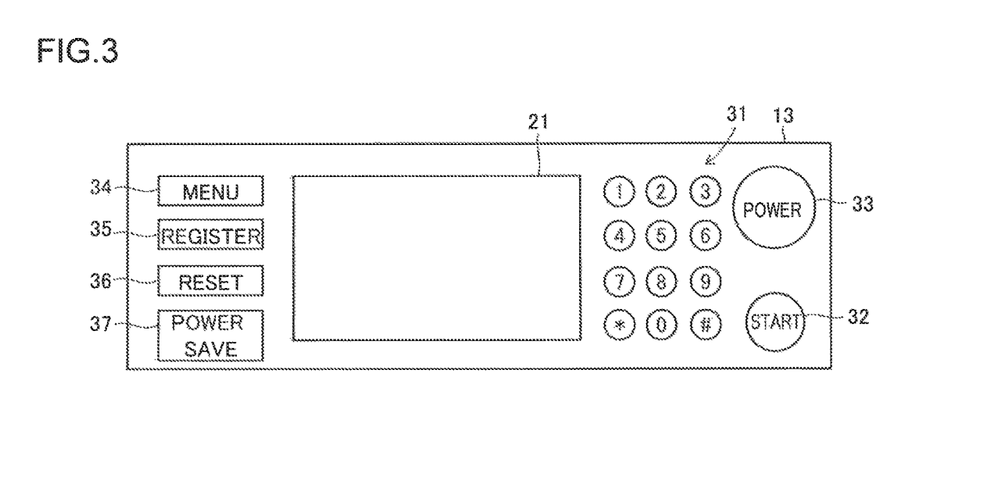
FIG. 3 illustrates a configuration of the display device.

Next, a configuration of the operation section 13 described above will be described. FIG. 3 is an outline view illustrating a schematic configuration of the operation section 13. With reference to FIG. 3, the operation section 13 includes: the numeric keys 31 including the numeric keys 0 to 9 for inputting the number of copies and the like and symbols "*" and "#"; a start key 32 for issuing an instruction for print start or facsimile transmission start; a power key 33 for turning the multifunctional peripheral 11 on or off; menu keys 34 for issuing instructions for selecting functions such as a printer function or a copying function of the multifunctional peripheral 11; a register key 35 for issuing an instruction for registration of various image forming conditions and registration of users; a reset key 36 for canceling an entry of an instruction input by a user with the numeric keys 31 or the like; a power saving key 37 serving as a key for a shift from a standby mode to a sleep mode or from the sleep mode to the standby mode; and the display screen 21 described above. The numeric keys 31 or the like are so-called hard keys. The display screen 21 also receives image forming conditions from the display screen 21 by, for example, pressing with a user's finger and can select functions, for example. The display screen 21 can additionally display a start key and a menu key. The operation section 13 includes a backlight 24. The lighting of the backlight 24 easies visual recognition of information displayed on the display screen 21. The backlight 24 is configured to be turned on or off in association with whether information is displayed on the display screen 21 or not.

The multifunction peripheral 11 has a first mode in which a predetermined power is consumed in a standby state and a second mode in which a power smaller than the predetermined power is consumed in a standby state. The first mode is a so-called standby mode in which an image can be formed immediately upon a request for image formation. In this first mode, the fixing roller 25 of the image forming unit 15 needs to be constantly kept at a temperature at which the fixing can be performed. In addition, the display screen 21 needs to be in a display state so that an input of information on the display screen 21, for example, can be immediately received. That is, the display screen 21 is caused to display information in the first mode. The first mode is a mode in which a relatively large amount of electric power is consumed because it is necessary to enable other components to be in a state where image formation can be immediately performed.

On the other hand, the second mode is a so-called sleep mode in which upon a request for image formation, image formation cannot be immediately performed and, after a lapse of a predetermined time, the mode shifts to a standby mode so that image formation can be performed. The predetermined time is a time mainly necessary for heating the fixing roller 25 to a temperature at which fixing can be performed. The second mode is a mode in which the fixing roller 25 is kept at a relatively low temperature and the display screen 21 is in a non-display state, and thus, necessary power consumption is smaller than that in the first mode. With control by the control section 12, the temperature of the fixing roller 25 in the second mode is kept at a temperature lower than the temperature of the fixing roller 25 in the first mode. That is, an electric power supplied to the fixing roller 25 is smaller in the second mode than in the first mode.

In the standby mode that is maintained in a predetermined period after image formation, in a case where no request is issued for image formation in a predetermined period and no signal such as an operation in the operation section 13 is input or pressing of the power saving key 37 for shifting to the second mode as a power saving mode is detected, as a first condition, a mode shift control unit 43, which will be described later, shifts the mode to the sleep mode that is the second mode in which a small amount of power is consumed. In a case where an input of a signal, such as a user's operation with the operation section 13 is detected or a case where next pressing of the power saving key 37 is detected as a second condition, the sleep mode shifts to the standby mode as the first mode. The shift from the sleep mode to the standby mode is also referred to as return from the sleep mode.

The return from the sleep mode is specifically performed in the following procedure. When contact with the display screen 21 by, for example, a user's finger is detected, this detection is input as a return signal from the operation section 13. Thereafter, a return signal for performing heating of the fixing roller 25 included in the image forming unit 15 and display of the display screen 21 is output. This mechanism also called an operation section system that detects contact with the display screen 21 by, for example, a user's finger is always running, that is, is also running in the sleep mode.

Figure 4:
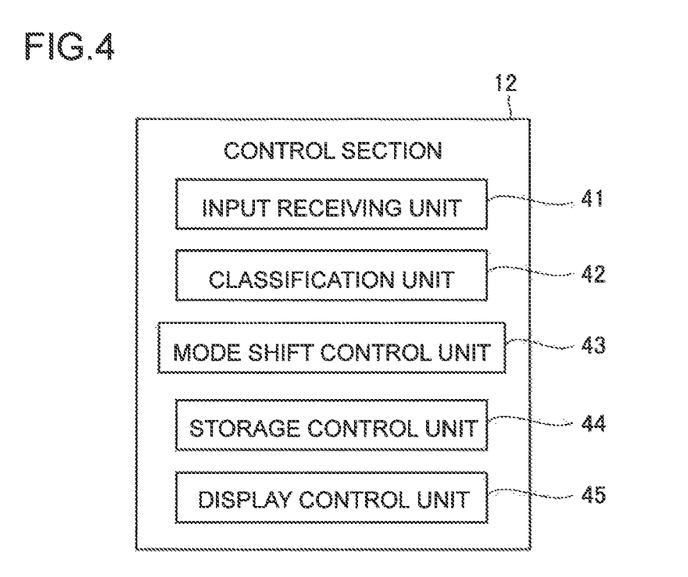
FIG. 4 is a block diagram illustrating a control section.

A configuration of the control section 12 will now be described. FIG. 4 is a block diagram illustrating a configuration of the control section 12. With reference to FIG. 4, the control section 12 includes an input receiving unit 41, a classification unit 42, the mode shift control unit 43, a storage control unit 44, and a display control unit 45. The input receiving unit 41 receives an input of information. The classification unit 42 classifies the information received by the input receiving unit 41 into a first setting and a second setting. The first setting is a setting for information requiring a relatively low level of security. Specifically, in the case of copying, the first setting is a setting of the number of sheets and a concentration, and in the case of facsimile transmission, the first setting is a setting of the name of a sender of facsimile. On the other hand, the second setting is a setting for information requiring a relatively high level of security. Specifically, in the case of facsimile transmission, the second setting is a setting of the name of a sender or the address of the sender. The mode shift control unit 43 performs such control that if the first condition is satisfied in the first mode, the first mode shifts to the second mode, and if the second condition is satisfied in the second mode, the second mode shifts to the first mode. The storage control unit 44 performs such control that data of the first setting is stored in the hard disk 17 when the first mode shifts to the second mode by the mode shift control unit 43. The display control unit 45 performs such control that an entry of the first setting stored in the hard disk 17 is displayed for the first setting and an entry of an initial setting is displayed for the second setting when the second mode shifts to the first mode by the mode shift control unit 43. These configurations will be described in detail later.

Figure 5:
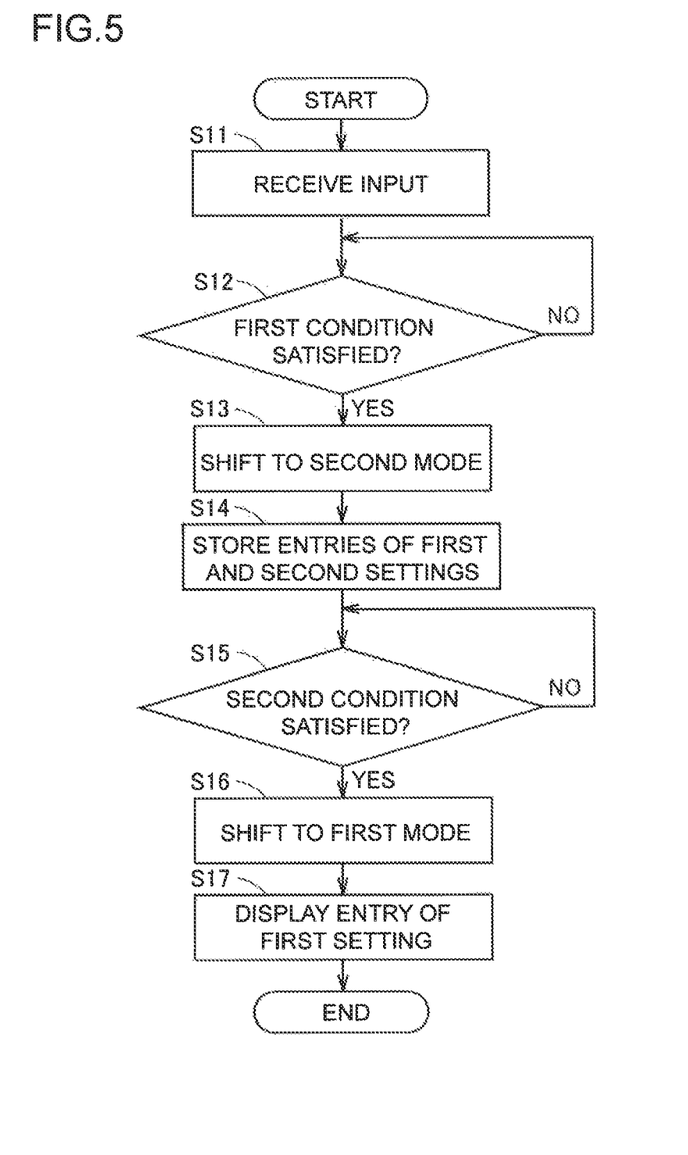
FIG. 5 is a flowchart showing a flow of a process in a case where setting of a facsimile transmission is interrupted.

A flow of a process in a case where setting of facsimile transmission is interrupted in the multifunction peripheral 11 will now be described. FIG. 5 is a flowchart showing the flow of the process in the case where setting of facsimile transmission is interrupted.

With reference to FIG. 5, to perform facsimile transmission, a user moves to a place where the multifunction peripheral 11 is placed while carrying a document for facsimile transmission. Then, the user loads the document for facsimile transmission on the ADF 22 and performs setting of facsimile transmission with the operation section 13. The operation section 13 receives an input of setting information (step S11 in FIG. 5; "step" will be hereinafter omitted). In this case, the display screen 21 is in a state where information is displayed and the backlight 24 is on, that is, in the so-called standby mode. Here, the operation section 13 operates as the input receiving unit 41.

Figure 6:
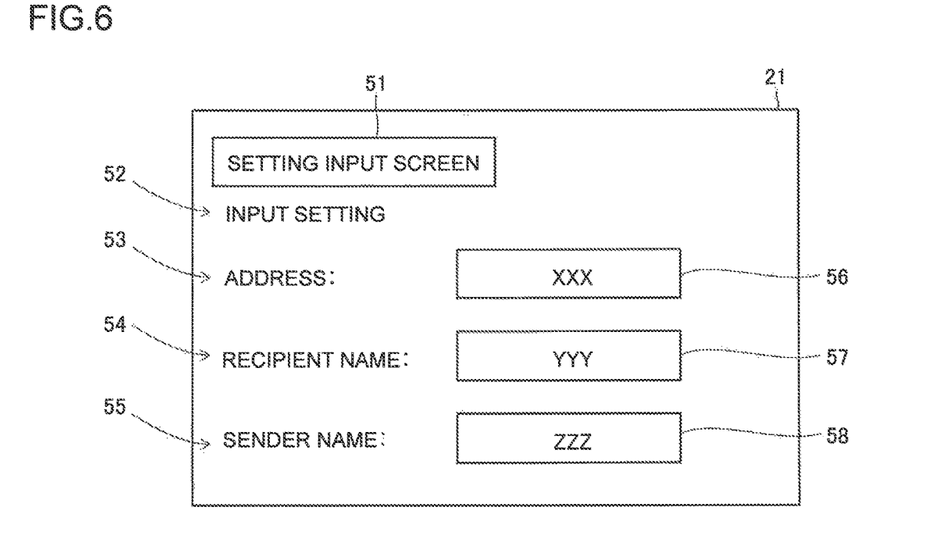
FIG. 6 illustrates an example of a display screen of the operation section.

FIG. 6 illustrates an example of the display screen 21 of the operation section 13. With reference to FIG. 6, the display screen 21 displays an indication 51 of "setting input screen," a message 52 of "input setting," characters 53 of "address" indicating an entry column of an address of facsimile transmission, characters 54 of "recipient name" indicating an entry column of the name of a recipient of facsimile transmission, characters 55 of "sender name" indicating an entry column of the name of a sender of facsimile transmission, an address input section 56 located adjacent to the characters 53 and used for inputting the address of facsimile transmission, a recipient input section 57 located adjacent to the characters 54 and used for inputting the name of the recipient of facsimile transmission, and a sender input section 58 located adjacent to the characters 55 and used for inputting the name of the sender of facsimile transmission.

Here, the classification unit 42 classifies the information received by the input receiving unit 41 into the first setting and the second setting. Specifically, the classification unit 42 classifies settings of the address input section 56 and the recipient input section 57 as the second setting. The classification unit 42 classifies a setting of the sender input section 58 as the first setting. The classification by the classification unit 42 is previously determined.

A user sets inputs to the address input section 56, the recipient input section 57, and the sender input section 58. Specifically, a setting "XXX" is input to the address input section 56, a setting "YYY" is input to the recipient input section 57, and a setting "ZZZ" is input to the sender input section 58. The operation section 13 receives inputs of settings.

Here, at this stage of input of settings, suppose the user leaves the multifunction peripheral 11 because of an incoming call or other reasons before facsimile transmission in the multifunction peripheral 11 is completed. That is, in the multifunction peripheral 11, the user interrupts setting of facsimile transmission. Then, the mode shift control unit 43 determines whether the first condition is satisfied or not (S12). Specifically, it is determined whether a predetermined time has elapsed or not without any operation in the operation section 13.

If it is determined that the predetermined time has elapsed without any operation in the operation section 13 because of an extension of a call of the user or other reasons (YES in S12), it is determined that the first condition is satisfied, and the first mode shifts to the second mode (S13). That is, the standby mode shifts to the sleep mode. Specifically, the display screen 21 is not displayed, and the backlight 24 is turned off. Then, the entry displayed on the display screen 21 is not visually recognized any more.

Here, the storage control unit 44 performs such control that the hard disk 17 stores data of an entry of the first setting and data of an entry of the second setting when the first mode shifts to the second mode by the mode shift control unit 43 (S14). That is, the hard disk 17 stores information on the setting "ZZZ" of the sender input section 58 that is an entry of the first setting, information on the setting "XXX" of the address input section 56 that is an entry of the second setting, and information on the setting "YYY" of the recipient input section 57.

Thereafter, the call is finished, and the user returns to the place where the multifunction peripheral 11 is placed in order to restart the facsimile transmission. The user then touches the display screen 21 of the operation section 13. Then, the mode shift control unit 43 detects contact with the display screen 21, and determines that the second condition is satisfied (YES in S15). Subsequently, the second mode shifts to the first mode (S16). That is, the sleep mode shifts to the standby mode.

Here, the display control unit 45 performs such control that when the mode shift control unit 43 shifts from the second mode to the first mode an entry of the first setting stored in the hard disk 17 is displayed for the first setting and an entry of an initial setting is displayed for the second setting (S17). The initial setting refers to a state where no settings are made.

Figure 7:
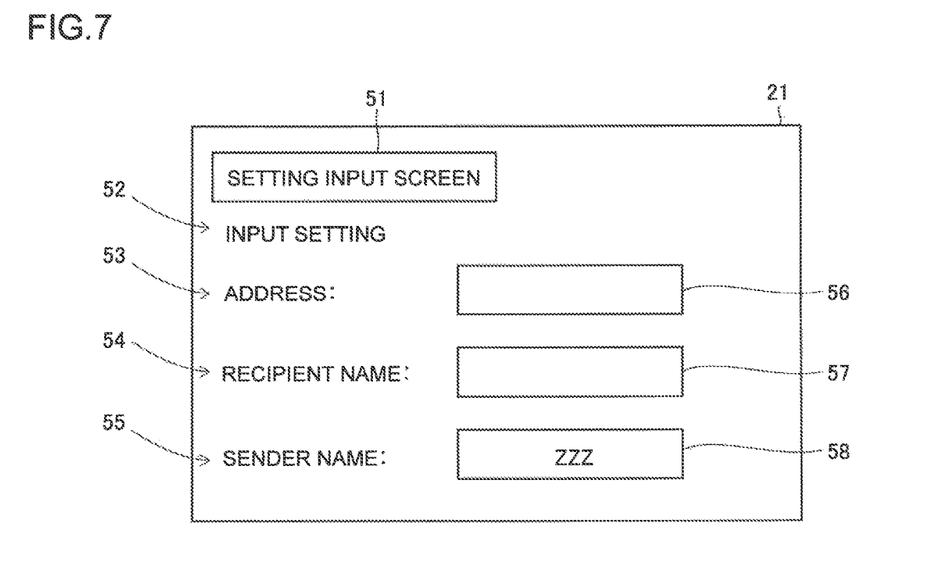
FIG. 7 illustrates another example of the display screen of the operation section.

FIG. 7 illustrates an example of the display screen 21 of the operation section 13 in this case. With reference to FIG. 7, in a manner similar to FIG. 6, the display screen 21 displays the characters 53, 54, and 55, the address input section 56, the recipient input section 57, and the sender input section 58. Here, although "XXX" and "YYY" are input to the address input section 56 and the recipient input section 57, respectively, in the first setting illustrated in FIG. 6, these columns for the address input section 56 and the recipient input section 57 are blank. These blank columns are entries of the initial setting.

The user who tried to transmit facsimile inputs entries to the address input section 56 and the recipient input section 57 again. On the other hand, since the entry ""ZZZ" is reflected on the sender input section 58, no entry needs to be made to the sender input section 58. Thereafter, the user presses the start key 32 so that an image on the document is read by the image reading unit 14, and facsimile transmission is performed.

In the multifunction peripheral 11 having this configuration, since an entry set before the shift to the sleep mode is reflected without change on the sender input section 58 requiring a low level of security, no additional input is needed. On the other hand, in a case where not the user who tried to perform facsimile transmission by inputting "XXX" to the address input section 56 and "YYY" to the recipient input section 57, but another user makes a shift to the sleep mode, since the columns of the address input section 56 and the recipient input section 57 are blank, information on these sections are not known by this another user. Accordingly, the multifunction peripheral 11 having this configuration can enhance convenience while maintaining security.

In this case, since the information is classified into the predetermined first and second settings, it is possible to enhance convenience while further ensuring security in the predetermined settings.

In the embodiment described above, the classification unit 42 may classify information into the first setting and the second setting in accordance with a request from a user. That is, for example, in accordance with a request from a user through the operation section 13, a setting of an input to the address input section 56 is classified as the first setting in the above case. In this manner, a setting in accordance with a need of the user can be made.

In the embodiment described above, the classification unit 42 may classify the information as the second setting if the information received by the input receiving unit 41 includes a predetermined character string. In this manner, a higher level of security can be obtained. Specifically, the information corresponds to an at sign "@" often used for indicating an electronic address or the like and a character string such as ".com" indicating an address on the Internet.

In the embodiment described above, the second setting may include at least one of a setting of a password for authenticating a user and a setting of personal information of the user. Such settings typically have relatively high levels of security, and thus, this configuration can obtain a higher level of security.

In the embodiment described above, the multifunction peripheral 11 including the operation section 13 may be configured to further include a timer that measures time. The display control unit 45 may perform such control that if the time measured by the timer after the first mode shifts to the second mode by the mode shift control unit 43 exceeds a predetermined time, an entry of an initial setting is displayed for the first setting and the second setting when the second mode shifts to the first mode by the mode shift control unit 43. The multifunction peripheral 11 may be configured to further include a shooting section that shoots a periphery of the multifunction peripheral 11 including the operation section 13. The display control unit 45 may perform such control that when the second mode shifts to the first mode by the mode shift control unit 43, it is determined whether a person near the display device 11 shot by the shooting section is identical before and after the shift to the first mode, and if it is determined that the person is identical, an entry of the first setting and an entry of the second setting stored on the hard disk 17 are respectively displayed for the first setting and the second setting when the second mode shifts to the first mode by the mode shift control unit 43. This configuration may be employed.

Figure 8:
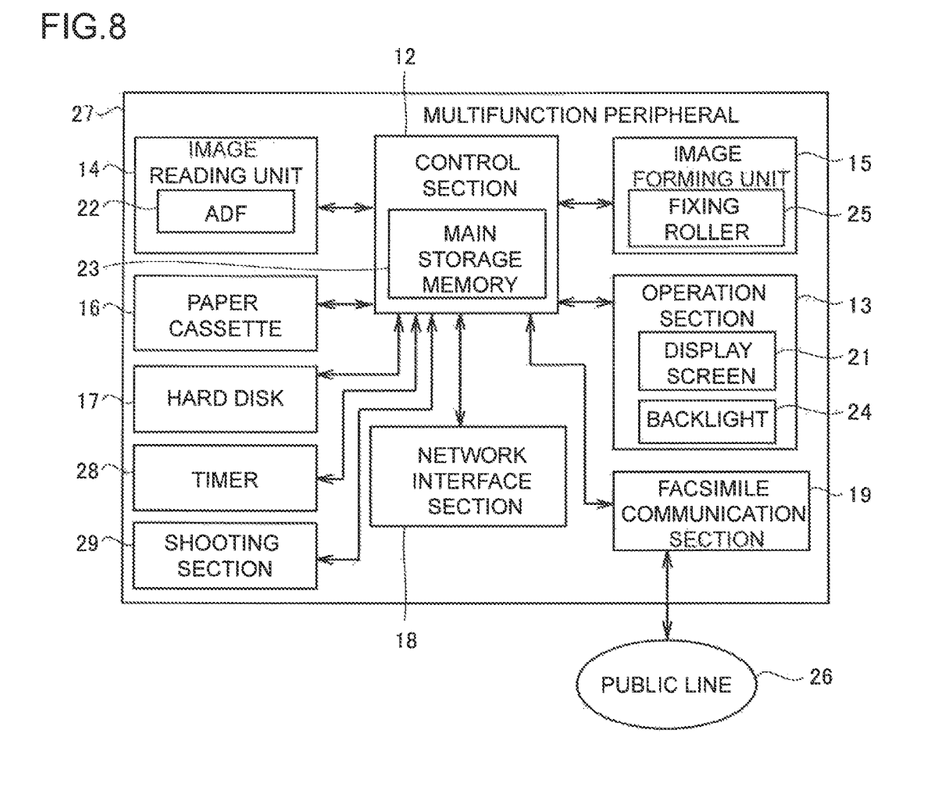
FIG. 8 is a block diagram illustrating a configuration of a multifunction peripheral in a case where an image forming apparatus including a display device according to another embodiment of the present disclosure is applied to the multifunction peripheral.

FIG. 8 is a block diagram illustrating a configuration of a multifunction peripheral in a case where an image forming apparatus including a display device according to another embodiment of the present disclosure is applied to the multifunction peripheral. FIG. 8 corresponds to FIG. 2, and the same components are denoted by the same reference numerals, and description thereof will not be repeated. With reference to FIG. 8, a multifunction peripheral 27 includes a timer 28 and a shooting section 29. The timer 28 measures time. The display control unit 45 performs such control that if the time measured by the timer after a shift from the first mode to the second mode by the mode shift control unit 43 exceeds a predetermined time, an entry of the initial setting is displayed for the first setting and the second setting when the second mode shifts to the first mode by the mode shift control unit 43.

With this configuration, even if a user who tried to transmit facsimile does not return to the multifunction peripheral 11, all the settings are made to initial settings so that insufficient settings of inputs can be canceled. This predetermined time is a so-called auto clear time.

The shooting section 29 shoots a periphery of the multifunction peripheral 11 including the operation section 13. The display control unit 45 may perform such control that when the second mode shifts to the first mode by the mode shift control unit 43, it is determined whether a person near the display device 11 shot by the shooting section is identical before and after the shift to the first mode, and if it is determined that the person is identical, an entry of the first setting and an entry of the second setting stored in the hard disk 17 are respectively displayed for the first setting and the second setting when the second mode shifts to the first mode by the mode shift control unit 43.

With this configuration, if persons before and after the shift to the second mode are determined to be identical, there is no problems in terms of security, and all the settings are displayed and reflected in order to enhance convenience of a user. In this case, the display control unit 45 determines whether the persons are identical or not using a face recognition function and based on, for example, coincidence of clothes of the persons.

In the embodiment described above, the control section 12, for example, is included in the multifunction peripheral 11. However, the present disclosure is not limited to this example, and the control section 12, for example, may be included in the operation section 13 as a display device. That is, the display device according to the present disclosure may be a display device for displaying information having a first mode in which a predetermined power is consumed and a second mode in which a power smaller than the predetermined power is consumed. The display device includes an input receiving unit, a classification unit, a display screen, a storage section, a mode shift control unit, a storage control unit, and a display control unit. The input receiving unit receives an input of information. The classification unit classifies the information received by the input receiving unit into a first setting and a second setting. The display screen is capable of displaying the information received by the input receiving unit. The storage section stores data. The mode shift control unit performs such control that if a first condition is satisfied in the first mode, the display screen is not displayed and the first mode shifts to the second mode, and that if a second condition is satisfied in the second mode, the display screen is displayed and the second mode shifts to the first mode. The storage control unit performs such control that the storage section stores data of the first setting and data of the second setting when the first mode shifts to the second mode by the mode shift control unit. The display control unit performs such control that when the second mode shifts to the first mode by the mode shift control unit, as information displayed on the display screen, an entry of the first setting stored in the storage section is displayed for the first setting and an entry of an initial setting is displayed for the second setting. This configuration may be employed. In this manner, it is possible to enhance convenience while obtaining security.

It should be understood that the embodiments disclosed here are illustrative and non-restrictive in every respect. The scope of the present disclosure is defined by the terms of the claims, rather than the description above, and is intended to include any modifications within the scope and meaning equivalent to the terms of the claims.

The display device and the image forming apparatus are effectively used especially in the case of requiring high degrees of security and convenience.

What is claimed is:

1. A display device for displaying information, the display device having a first mode in which a predetermined power is consumed and a second mode in which a power smaller than the predetermined power is consumed, the display device comprising:
  an input receiving unit that receives an input of information;
  a classification unit that classifies the information received by the input receiving unit into a first setting and a second setting;
  a display screen capable of displaying the information received by the input receiving unit;
  a storage section that stores data;
  a mode shift control unit that performs such control that if a first condition is satisfied in the first mode, the display screen is not displayed and the first mode shifts to the second mode, and that if a second condition is satisfied in the second mode, the display screen is displayed and the second mode shifts to the first mode;
  a storage control unit that performs such control that the storage section stores data of the first setting and the second setting when the first mode shifts to the second mode by the mode shift control unit;
  a display control unit that performs such control that as information displayed on the display screen, an entry of the first setting stored in the storage section is displayed for the first setting and an entry of an initial setting is displayed for the second setting when the second mode shifts to the first mode by the mode shift control unit; and
  a timer that measures time, wherein
  the display control unit performs such control that if the time measured by the timer after the first mode shifts to the second mode by the mode shift control unit exceeds a predetermined time, an entry of an initial setting is displayed for the first setting and the second setting when the second mode shifts to the first mode by the mode shift control unit.

2. The display device according to claim 1, wherein the classification unit classifies the information received by the input receiving unit into the first setting and the second setting in accordance with a request from a user.

3. The display device according to claim 1, wherein the classification unit classifies the information received by the input receiving unit as the second setting if the information includes a predetermined character string.

4. The display device according to claim 1, wherein the second setting includes at least one of a setting of a password for authenticating a user and a setting of personal information of the user.

5. The display device according to claim 1, further comprising an image shooting section that shoots a periphery of the display device, wherein
  the display control unit performs such control that when the second mode shifts to the first mode by the mode shift control unit, it is determined whether a person near the display device shot by the image shooting section is identical before and after the shift to the first mode via visual recognition, and if it is determined that the person is identical, an entry of the first setting and an entry of the second setting stored in the storage section are respectively displayed for the first setting and the second setting when the second mode shifts to the first mode by the mode shift control unit.

6. An image forming apparatus comprising:
  a display device for displaying information, the display device having a first mode in which a predetermined power is consumed and a second mode in which a power smaller than the predetermined power is consumed; and
  an image forming unit that forms an image in accordance with an image forming condition for which an input is received by the display device in the first mode,
  the display device including an input receiving unit that receives an input of information, a classification unit that classifies the information received by the input receiving unit into a first setting and a second setting, a display screen capable of displaying the information received by the input receiving unit, a storage section that stores data, a mode shift control unit that performs such control that if a first condition is satisfied in the first mode, the display screen is not displayed and the first mode shifts to the second mode, and that if a second condition is satisfied in the second mode, the display screen is displayed and the second mode shifts to the first mode, a storage control unit that performs such control that the storage section stores data of the first setting and the second setting when the first mode shifts to the second mode by the mode shift control unit, and a display control unit that performs such control that as information displayed on the display screen, an entry of the first setting stored in the storage section is displayed for the first setting and an entry of an initial setting is displayed for the second setting when the second mode shifts to the first mode by the mode shift control unit; and a timer that measures time, wherein the display control unit performs such control that if the time measured by the timer after the first mode shifts to the second mode by the mode shift control unit exceeds a predetermined time, an entry of an initial setting is displayed for the first setting and the second setting when the second mode shifts to the first mode by the mode shift control unit.

7. A display device for displaying information, the display device having a first mode in which a predetermined power is consumed and a second mode in which a power smaller than the predetermined power is consumed, the display device comprising:

an input receiving unit that receives an input of information;

a classification unit that classifies the information received by the input receiving unit into a first setting and a second setting;

a display screen capable of displaying the information received by the input receiving unit;

a storage section that stores data;

a mode shift control unit that performs such control that if a first condition is satisfied in the first mode, the display screen is not displayed and the first mode shifts to the second mode, and that if a second condition is satisfied in the second mode, the display screen is displayed and the second mode shifts to the first mode;

a storage control unit that performs such control that the storage section stores data of the first setting and the second setting when the first mode shifts to the second mode by the mode shift control unit;

a display control unit that performs such control that as information displayed on the display screen, an entry of the first setting stored in the storage section is displayed for the first setting and an entry of an initial setting is displayed for the second setting when the second mode shifts to the first mode by the mode shift control unit; and an image shooting section that shoots a periphery of the display device, wherein the display control unit performs such control that when the second mode shifts to the first mode by the mode shift control unit, it is determined whether a person near the display device shot by the image shooting section is identical before and after the shift to the first mode via visual recognition, and if it is determined that the person is identical, an entry of the first setting and an entry of the second setting stored in the storage section are respectively displayed for the first setting and the second setting when the second mode shifts to the first mode by the mode shift control unit.

8. The display device according to claim 7, wherein the classification unit classifies the information received by the input receiving unit into the first setting and the second setting in accordance with a request from a user.

9. The display device according to claim 7, wherein the classification unit classifies the information received by the input receiving unit as the second setting if the information includes a predetermined character string.

10. The display device according to claim 7, wherein the second setting includes at least one of a setting of a password for authenticating a user and a setting of personal information of the user.

* * * * *